United States Patent [19]
Birrell

[11] Patent Number: 6,098,936
[45] Date of Patent: Aug. 8, 2000

[54] PORTABLE ERGONOMIC WORK STATION

[76] Inventor: Andrew Birrell, 9811 State Rte. 7, Box 415, Kinsman, Ohio 44428

[21] Appl. No.: 09/027,822

[22] Filed: Feb. 23, 1998

[51] Int. Cl.[7] ........................................................ A47F 5/00
[52] U.S. Cl. .................................... 248/122.1; 248/124.1; 248/917
[58] Field of Search ............................ 248/122.1, 124.1, 248/125.7, 298.1, 299.1, 278.1, 281.11, 917, 415

[56] References Cited

U.S. PATENT DOCUMENTS

| | | | |
|---|---|---|---|
| 1,013,711 | 2/1912 | Wiggins | 248/122.1 |
| 2,163,859 | 6/1939 | Bockel | 248/122.1 |
| 2,686,040 | 8/1954 | Lear | 248/122.1 |
| 3,160,379 | 12/1964 | Gardella | 248/125.7 |
| 4,226,390 | 10/1980 | Steggall | 248/124 |
| 4,638,969 | 1/1987 | Brown | 248/122 |
| 4,742,980 | 5/1988 | Heigl | 248/125 |
| 4,779,922 | 10/1988 | Cooper | 297/188 |
| 5,348,324 | 9/1994 | Trotta | 280/35 |
| 5,630,566 | 5/1997 | Case | 248/122.1 |

*Primary Examiner*—Leslie A. Braun
*Assistant Examiner*—Kimberly Wood
*Attorney, Agent, or Firm*—Harpman & Harpman

[57] ABSTRACT

An adjustable computer work stand that will allow for convenient computer component placement for an individual in a non-conventional work environment. The work stand is portable and includes multiple adjustable support elements that can independently support the computer components including the keyboard, video monitor and CPU. The work stand can be adjusted to position a pair of support arms on which the components are placed to be accessible to the user in a reclining chair or other non-conventional work environment.

6 Claims, 4 Drawing Sheets

6,098,936

PORTABLE ERGONOMIC WORK STATION

BACKGROUND OF THE INVENTION

1. Technical Field

This device relates to work component stands and supports that are used to hold a variety of electronic components. Such devices are typically portable allowing for movement of the components from room to room.

2. Description of Prior Art

Prior art devices of this type have been developed to provide self-contained support enclosures that can accommodate electronic components in a portable structure, see for example U.S. Pat. Nos. 4,638,969, 5,348,324 and 5,630,566.

In U.S. Pat. No. 4,638,969 a video display arrangement is disclosed in which a fixed stand has a center support pole from which extends a fixed arm. A video monitor is pivotally positioned on the arm and a secondary keyboard support bracket extends from the fixed arm for support of same.

U.S. Pat. No. 3,348,324 is directed towards a transportable component stand having a wheeled cart-like configuration. A variety of adjustable upper frame brackets hold a video monitor and related components.

U.S. Pat. No. 5,630,566 discloses a portable work station for a computer that has a central support shaft from which extends a pair of articulated component supporting arms. Each arm can be adjusted in multiple paths, each having a mounting bracket on the free end thereof to which the components are secured.

Applicant's adjustable computer work stand provides a single articulated support arm extending from a central pivot support hub, rotatably positioned on a wheel support structure. A vertically adjustable secondary support arm is cantilevered from the support hub in a fixed horizontal plane.

SUMMARY OF THE INVENTION

An adjustable computer work stand for individually supporting computer components in a portable self-contained work environment. The work stand provides a central support and base with pivoting arm support hub from which extends an adjustable articulated keyboard support arm and a off set vertically adjustable pivoting monitor support arm. The support base has a fixed support shelf for the convention CPU of a computer system and a confinement cord bracket all of which are supported on a wheeled sub-support structure allowing for mobile positioning and movement of the work station within the environment.

DESCRIPTION OF THE PREFERRED EMBODIMENT

Figure 1:
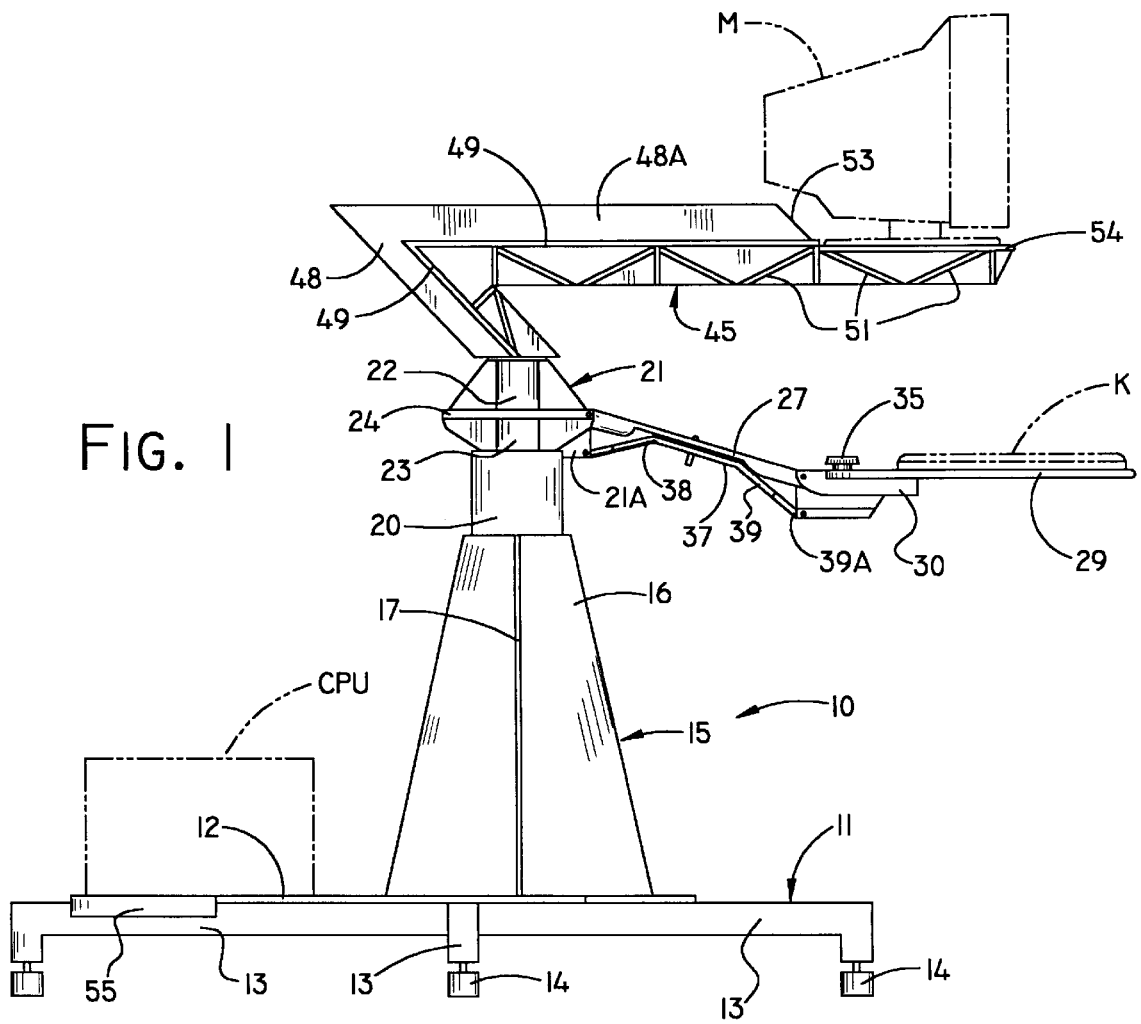
FIG. 1 is a side elevational view of the work station of the invention.
Figure 2:
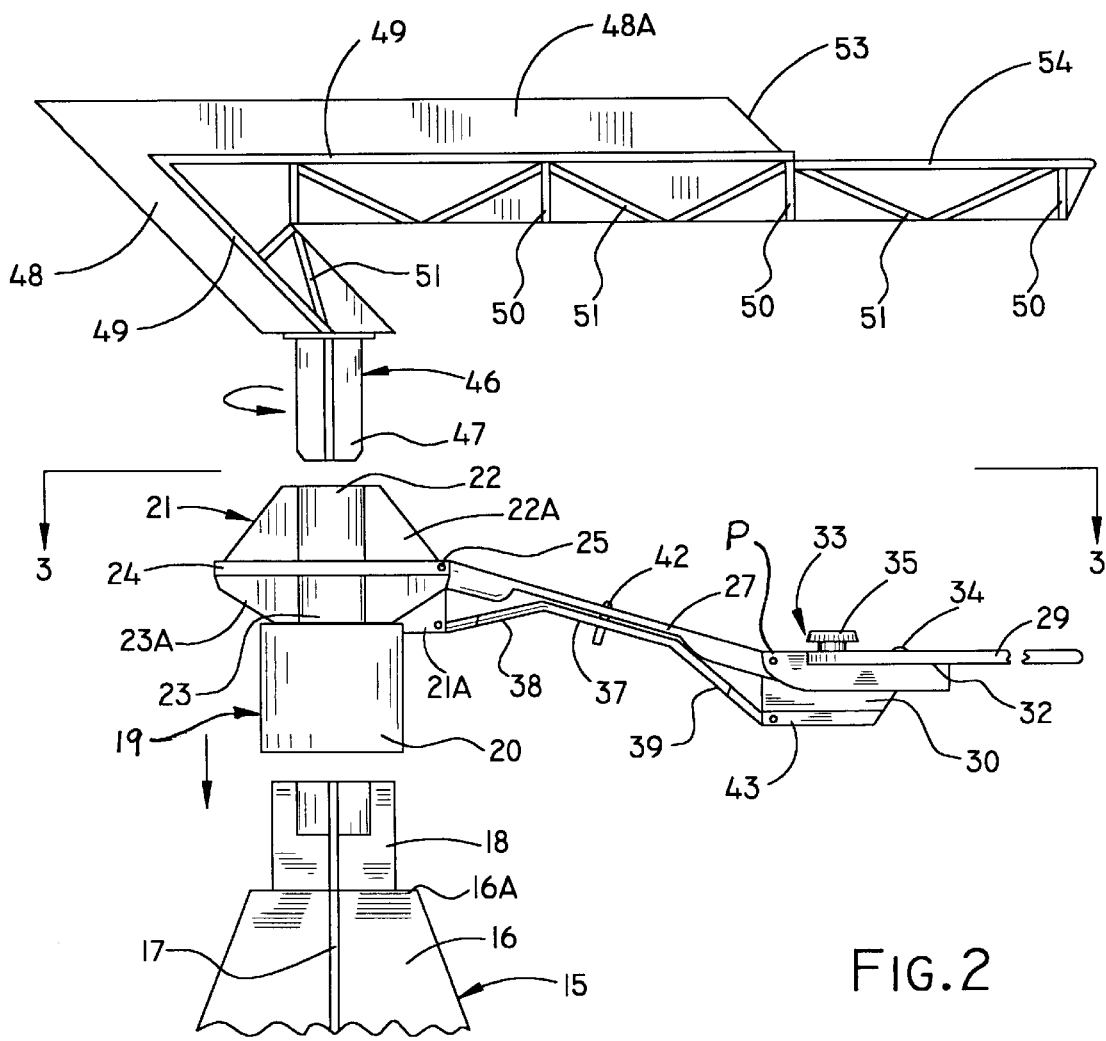
FIG. 2 is a partial exploded assembly side elevational view of the work station of the invention.

Referring now to FIGS. 1 and 2 of the drawings, a work support stand 10 can be seen having a main support base frame 11 with a mounting platform 12 positioned thereon. The base frame 11 is of a tubular construction having multiple legs 13 each of which has a wheeled assembly 14 extending therefrom. A main support column 15 extends from the mounting platform 12 having a pair of intersecting cross panels 16 and 17 that are tapered inwardly from the platform 12. Each of the panels 16 and 17 are notched along their oppositely disposed perimeter edges inwardly from their respective free ends at 16A and 17A defining an upstanding mounting lug area 18.

Figure 3:
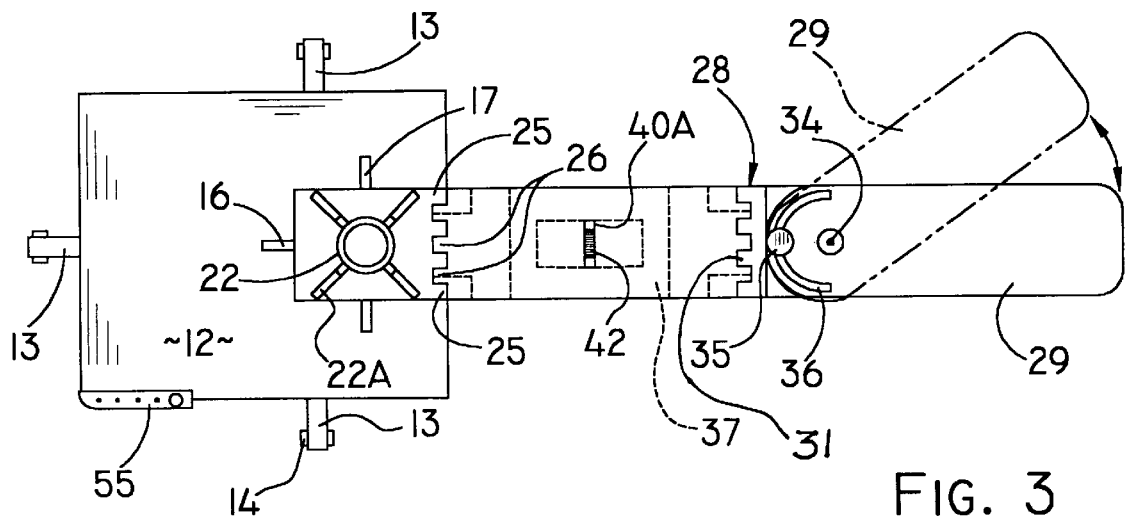
FIG. 3 is an enlarged top plan view on lines 3—3 of FIG. 2.

A central column cap and arm support 19 assembly has a registration sleeve 20 with an arm receiving fitting 21 extending therefrom. The arm receiving fitting 21 has a pair of oppositely disposed tubular elements 22 and 23 extending from a mounting plate 24. Each of the tubular elements 22 and 23 have multiple tapered web members 22A and 23A respectively extending therefrom, as best seen in FIGS. 2 and 3 of the drawings. The mounting plate 24 has a plurality of aligned apertured hinge tabs 25 extending therefrom for interengaged registration with corresponding tabs 26 on a hinge connector element 27 that forms part of an articulated keyboard support arm assembly 28.

An adjustable keyboard support shelf 29 is pivotally mounted to a shelf support fitting 30 that is, in turn, pivotally secured to the free end of the hinge connector element 27 by a plurality of interengaging apertures tabs 31 at a pivot point P as will be well understood by those skilled in the art. The shelf support fitting 30 has a off set area 32 with an upstanding threaded latch bolt assembly 33 and a central pivot pin fitting 34 in spaced relation thereto. Correspondingly, the keyboard shelf 29 is apertured to receive the pivot pin fitting 34 and has an arcuate slot at 36 in its engagement end with the hinge connection element 27 for receiving the threaded latch bolt assembly 33. This arrangement allows for lateral arcuate movement of the keyboard support shelf 29 as indicated by the broken lines and arrows in FIG. 3 of the drawings so that same can be positioned to a variety of angular inclinations in relation to the longitudinal access of the arm and locked in place by a locking knob 35 of the latch bolt assembly 33 as is evident to one skilled in the art.

Figure 4:
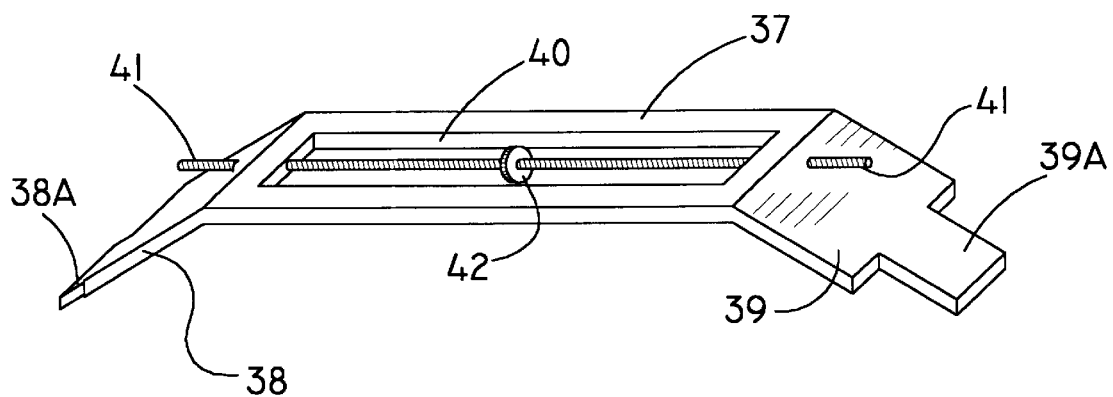
FIG. 4 is an enlarged perspective view of a height adjustable component of the invention.
Figure 5:
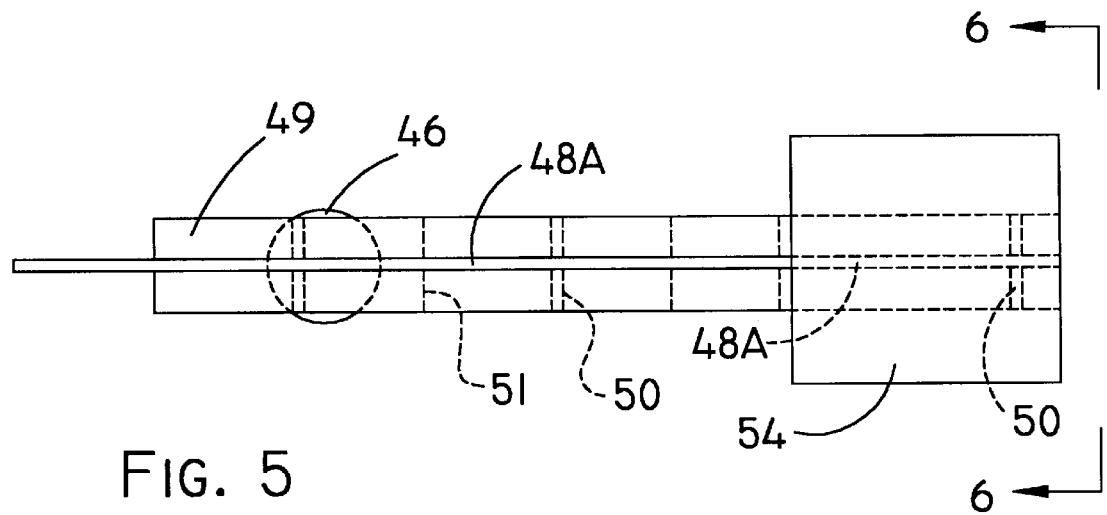
FIG. 5 is a top plan view of the support arm component of the invention.
Figure 6:
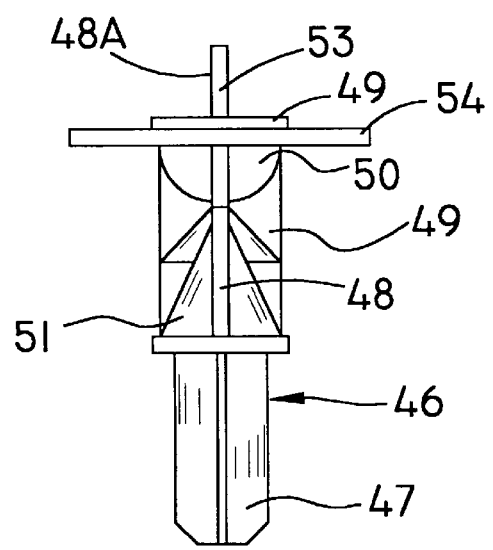
FIG. 6 is an end elevational view of the support arm on line 6—6 of FIG. 5.

A height adjustment bracket assembly for the keyboard assembly, best seen in FIGS. 2 and 4 of the drawings, has a central portion 37 with a pair of oppositely disposed angularly offset end brackets 38 and 39 each with a pivot hinge tab 38A and 39A assembly respectively.

The central portion 37 has an elongated opening therein at 40 through which a threaded adjustment rod 41 extends. A height lever and adjustment fitting 42 is threadably positioned on the hereinbefore described rod 41 so as to be rotatably positioned up through the opening at 40A in the hinge connector element 27. The pivot hinge tabs 38A and 39A are in turn pivotally secured to the arm mounting and receiving fitting 21 via a pair of apertured extension brackets 21A and to the the shelf support fitting 30 by a pair of connecting pivot fittings 43. As noted, the adjustable locking knob 35 is threadably secured on latch bolt assembly through the aperture in the support shelf 29 so as to be registerable thereon thus locking same as hereinbefore described in its adjustable position within the arcuate path.

Referring now to FIGS. 1, 2, 5 and 6 of the drawings, a monitor support arm 45 can be seen having a registering fitting 46 extending therefrom with multiple engagement insert fin pairs 47 extending in oppositely disposed relation that are registerable within the aforementioned tubular element 22 of the receiving fitting 21 as best seen in FIG. 2 of the drawings. The monitor support arm 45 has a main arm plate 48 extending angularly upwardly from the registration fitting 46 and then horizontally at 48A. Pairs of elongated tran-support gusses 49 extend midway along the length of the arm plate 48A with multiple transverse support plates 50 extending between the gussets 49 and the arm plate 48A in longitudinally spaced relation therealong with pairs of interdisposed angular interconnected reinforcing ribs 51 therebetween defining the structural truss configuration of the monitor support arm 45. The upper portion of the arm plate at 48A above the tran-support gussets 49 terminates at 53 having a monitor platform 54 extending in place of therefrom.

It will be evident from the above description that a computer monitor M (shown in broken lines in FIG. 1 of the drawings) can be supported by the monitor platform 54 and the support trust arm 45 can be rotated independently within the tubular fitting 22 providing a full range of arcuate motion thereto. Correspondingly, it will be seen that a computer component, such as a keyboard K, (shown in broken lines in FIG. 1 of the drawings) can be positioned and held on the keyboard support shelf 29 which as hereinbefore described can be adjusted vertically by the height adjustment assembly and rotated on the central axis defined by the registration sleeve 20 on the mounting support column as well as independent ancillary arcuate movement of the support shelf 29 as hereinbefore described. Referring back to FIG. 1 of the drawings it will be seen that the portion of the mounting platform 12 that extends beyond the engagement area of the main support column 15 will provide a mounting area for a CPU of a typical computer system (shown in broken lines) on which to be positioned. Additionally, a cord restraint bracket 55 is pivotally secured to the mounting platform 12 to secure power cords and the like, (not shown for clarity) typically associated with the electronic components of the typical computer system illustrated for use with the invention.

In use, it will be evident from the above description that the adjustable computer work station of the invention can be moved to independent areas for use thus freeing up the availability and ease of use of a typical desk top or similar type computer configuration well known and understood by those skilled in the art. By positioning the computer work station of the invention within locations not usually associated with computer components, the user can, for example, be seated in a more comfortable chair or other non-traditional area and be able to utilize the computer work station of the invention at that location by the adjustability of the elements, as hereinbefore described.

Thus, it will be seen that a new and useful mobile adjustable computer work stand has been illustrated and described and various changes and modifications may be made therein without departing from the spirit of the invention, therefore I claim:

1. A portable computer work station for supporting computer components for use by a person in a variety of remote locations, said work station comprises; a main support platform, a support column comprising a pair of interconnecting panels extending vertically from said platform, a central arm support having a registration sleeve registerable on said support column, a first arm member extending from a mounting plate on said registration sleeve, a second arm member extending from an arm receiving fitting on said arm support, said first arm member having a keyboard support shelf pivotally secured to an adjustable fitting pivotally secured to said support column, an arcuate mounting slot in said keyboard support shelf and a locking knob registration post therethrough, said second arm member including an angularly disposed arm plate portion and a longitudinal support element portion with an equipment support platform on the distal end thereof.

2. The portable computer work station set forth in claim 1 wherein said main support platform has a tubular brace frame with multiple wheeled assemblies associated therewith.

3. The portable computer work station of claim 2 wherein said mounting plate has a plurality of aligned spaced tabs along one perimeter edge thereof.

4. The portable workstation set forth in claim 1 wherein said arm plate portion and said longitudinal support element portion extending therefrom have a plurality of interconnecting support gussets thereon.

5. The portable computer station set forth in claim 1 wherein said second arm member is rotatable on said arm receiving fitting on said arm support.

6. The portable computer workstation set forth in claim 1 wherein said interconnecting panels are tapered inwardly from their free end forming a mounting lug frame.

\* \* \* \* \*